United States Patent
Lubow (10) Patent No.: US 7,156,308 B2
(45) Date of Patent: Jan. 2, 2007

(54) DOUBLE-SIDED BAR CODE DOUBLING AS A SINGLE BAR CODE

(75) Inventor: Allen Lubow, Brooklyn, NY (US)

(73) Assignee: International Barcode Corporation, New York, NY (US)

( * ) Notice: Subject to any disclaimer, the term of this patent is extended or adjusted under 35 U.S.C. 154(b) by 0 days.

(21) Appl. No.: 10/499,340

(22) PCT Filed: Dec. 17, 2002

(86) PCT No.: PCT/US02/41122

§ 371 (c)(1),
(2), (4) Date: Feb. 1, 2005

(87) PCT Pub. No.: WO03/052681

PCT Pub. Date: Jun. 26, 2003

(65) Prior Publication Data

US 2005/0121528 A1    Jun. 9, 2005

Related U.S. Application Data

(60) Provisional application No. 60/341,763, filed on Dec. 17, 2001.

(51) Int. Cl.
*G06K 7/10* (2006.01)

(52) U.S. Cl. .................. 235/462.01; 235/494

(58) Field of Classification Search .......... 235/462.01, 235/462.09, 494, 462.1; 283/81, 100, 104
See application file for complete search history.

(56) References Cited

U.S. PATENT DOCUMENTS

| | | |
|---|---|---|
| 3,211,470 A | 10/1965 | Wilson |
| 3,684,418 A | 8/1972 | Langecker |
| 3,698,600 A | 10/1972 | Foote |
| 3,985,603 A | 10/1976 | Berner |
| 3,985,605 A | 10/1976 | Treiber et al. |
| 4,076,570 A | 2/1978 | Medley et al. |
| 4,306,400 A | 12/1981 | Coleman |
| 4,319,684 A | 3/1982 | Backman |
| 4,342,038 A | 7/1982 | Lemelson |
| 4,531,313 A | 7/1985 | Fast |
| 4,539,766 A | 9/1985 | Fast |
| 4,573,596 A | 3/1986 | Slat |
| 4,586,316 A | 5/1986 | Backman |
| 4,601,926 A | 7/1986 | Jabarin |

(Continued)

FOREIGN PATENT DOCUMENTS

DE    10017141 A1    10/2001

(Continued)

OTHER PUBLICATIONS

"BarCode-1 2-Dimensional Bar Code Page" found at http://www.adams1.com/pub/russadam/stack.html printed on Mar. 21, 2006, 10 pages.

(Continued)

*Primary Examiner*—Daniel StCyr
(74) *Attorney, Agent, or Firm*—Davidson Berquist Jackson & Gowdey, LLP (57) ABSTRACT

A bar code including a first linear bar code portion, and portions with two-dimensional bar codes at the ends of the first bar code portion. A separation through the first portion. The two-dimensional bar code at each end is inverted from the other end, and in an embodiment is also rotated 180°, which enable the two-dimensional bar codes on separated parts of the single bar code to be identical.

9 Claims, 5 Drawing Sheets

U.S. PATENT DOCUMENTS

| | | | |
|---|---|---|---|
| 4,628,193 A | 12/1986 | Blum | |
| 4,661,001 A | 4/1987 | Takai | |
| 4,692,603 A | 9/1987 | Brass et al. | |
| 4,728,783 A | 3/1988 | Brass et al. | |
| 4,754,127 A | 6/1988 | Brass et al. | |
| 4,779,367 A | 10/1988 | Fast | |
| 4,782,221 A | 11/1988 | Brass et al. | |
| 4,794,239 A | 12/1988 | Allais | |
| 4,835,372 A | 5/1989 | Gombrich | |
| 4,842,141 A | 6/1989 | Segal | |
| 4,850,488 A | 7/1989 | Humbert | |
| 4,874,936 A | 10/1989 | Chandler et al. | |
| 4,889,367 A | 12/1989 | Miller | |
| 4,896,029 A | 1/1990 | Chandler et al. | |
| 4,939,354 A | 7/1990 | Priddy et al. | |
| 4,939,355 A | 7/1990 | Rando et al. | |
| 4,967,928 A | 11/1990 | Carter | |
| 4,998,010 A | 3/1991 | Chandler et al. | |
| 4,998,623 A | 3/1991 | Doull | |
| 5,008,151 A | 4/1991 | Tominaga | |
| 5,053,609 A | 10/1991 | Priddy et al. | |
| 5,118,369 A | 6/1992 | Shamir | |
| 5,122,969 A | 6/1992 | Seshimoto | |
| 5,124,536 A | 6/1992 | Priddy et al. | |
| 5,132,709 A | 7/1992 | West | |
| 5,153,418 A | 10/1992 | Batterman et al. | |
| 5,181,189 A | 1/1993 | Hafner | |
| 5,189,292 A | 2/1993 | Batterman et al. | |
| 5,197,215 A | 3/1993 | Torsleff | |
| 5,203,591 A | 4/1993 | Treat | |
| 5,206,490 A | 4/1993 | Petigrew | |
| 5,211,061 A | 5/1993 | Goodwin | |
| 5,223,701 A | 6/1993 | Batterman et al. | |
| 5,229,195 A | 7/1993 | Maruoka | |
| 5,235,172 A | 8/1993 | Oehlmann et al. | |
| 5,243,665 A | 9/1993 | Wang | |
| 5,252,395 A | 10/1993 | Maruoka | |
| 5,254,302 A | 10/1993 | Yamanaka | |
| 5,273,798 A | 12/1993 | Miner | |
| 5,278,271 A | 1/1994 | Miyajima | |
| D347,021 S | 5/1994 | Adams et al. | |
| 5,331,118 A | 7/1994 | Jensen | |
| 5,364,133 A | 11/1994 | Hofer | |
| 5,369,261 A | 11/1994 | Shamir | |
| 5,372,439 A | 12/1994 | Poole | |
| 5,389,437 A | 2/1995 | Miyajima | |
| 5,415,482 A | 5/1995 | Poole | |
| 5,468,110 A | 11/1995 | McDonald | |
| 5,488,815 A | 2/1996 | Abrams | |
| 5,493,107 A | 2/1996 | Gupta | |
| 5,553,084 A | 9/1996 | Ackley et al. | |
| 5,565,059 A | 10/1996 | Edwards | |
| 5,577,367 A | 11/1996 | Abrams | |
| 5,578,797 A | 11/1996 | Hewitt | |
| 5,586,037 A | 12/1996 | Gil | |
| 5,591,956 A | 1/1997 | Longacre, Jr. et al. | |
| 5,593,267 A | 1/1997 | McDonald | |
| 5,615,575 A | 4/1997 | Goodwin | |
| 5,620,087 A | 4/1997 | Martin | |
| 5,657,066 A | 8/1997 | Adams | |
| 5,658,410 A | 8/1997 | Edwards | |
| 5,674,347 A | 10/1997 | Edwards | |
| 5,675,137 A | 10/1997 | van Haagen et al. | |
| 5,678,137 A | 10/1997 | Katayama | |
| 5,696,686 A | 12/1997 | Sanka | |
| 5,733,693 A | 3/1998 | Nohr | |
| 5,740,648 A | 4/1998 | Brown et al. | |
| 5,752,234 A | 5/1998 | Withers | |
| 5,768,991 A | 6/1998 | Cless | |
| 5,770,841 A | 6/1998 | Moed | |
| 5,776,297 A | 7/1998 | Edwards | |
| 5,777,310 A | 7/1998 | Liu | |
| 5,780,830 A | 7/1998 | Boie | |
| 5,790,162 A | 8/1998 | Adams | |
| 5,803,499 A | 9/1998 | Tung et al. | |
| 5,811,776 A * | 9/1998 | Liu | 235/462.27 |
| 5,816,718 A | 10/1998 | Poole | |
| 5,818,492 A | 10/1998 | Look | |
| 5,822,738 A | 10/1998 | Shah | |
| 5,840,243 A | 11/1998 | Hicks et al. | |
| 5,845,255 A | 12/1998 | Mayaud | |
| 5,865,471 A | 2/1999 | Nohr et al. | |
| 5,869,341 A | 2/1999 | Woodaman | |
| 5,872,585 A | 2/1999 | Donato et al. | |
| 5,874,980 A | 2/1999 | West | |
| 5,878,885 A | 3/1999 | Wangu et al. | |
| 5,880,443 A | 3/1999 | McDonald et al. | |
| 5,889,270 A | 3/1999 | van Haagen et al. | |
| 5,895,075 A | 4/1999 | Edwards | |
| 5,909,233 A | 6/1999 | Hamman et al. | |
| 5,920,062 A | 7/1999 | Williams | |
| 5,953,170 A | 9/1999 | Glancy | |
| 5,978,004 A | 11/1999 | Ehrhardt | |
| 5,995,128 A | 11/1999 | Adams et al. | |
| 6,003,006 A | 12/1999 | Colella et al. | |
| 6,020,906 A | 2/2000 | Adams et al. | |
| 6,021,392 A | 2/2000 | Lester et al. | |
| 6,027,022 A | 2/2000 | Hong et al. | |
| 6,032,861 A | 3/2000 | Lemelson | |
| 6,034,708 A | 3/2000 | Adams et al. | |
| 6,036,087 A | 3/2000 | Hong et al. | |
| 6,057,870 A | 5/2000 | Monnier et al. | |
| 6,060,200 A | 5/2000 | Nohr et al. | |
| 6,070,805 A | 6/2000 | Kaufman et al. | |
| 6,082,264 A | 7/2000 | Meyer et al. | |
| 6,098,892 A | 8/2000 | Peoples, Jr. | |
| 6,109,526 A * | 8/2000 | Ohanian et al. | 235/462.45 |
| 6,151,037 A | 11/2000 | Kaufman et al. | |
| 6,152,621 A | 11/2000 | Langan | |
| 6,190,610 B1 | 2/2001 | Goldsmith et al. | |
| 6,210,795 B1 | 4/2001 | Nelson et al. | |
| 6,219,587 B1 | 4/2001 | Ahlin et al. | |
| 6,234,781 B1 | 5/2001 | Hicks et al. | |
| 6,240,403 B1 | 5/2001 | Shah et al. | |
| 6,253,817 B1 | 7/2001 | Edwards et al. | |
| 6,259,654 B1 | 7/2001 | de la Huerga | |
| 6,270,724 B1 | 8/2001 | Woodaman | |
| 6,273,986 B1 | 8/2001 | Egan | |
| 6,304,323 B1 | 10/2001 | Ishikura et al. | |
| 6,332,574 B1 | 12/2001 | Shigekusa | |
| 6,365,176 B1 | 4/2002 | Bell et al. | |
| 6,370,841 B1 | 4/2002 | Chudy et al. | |
| 6,370,844 B1 | 4/2002 | Stricker | |
| 6,398,117 B1 | 6/2002 | Oakeson et al. | |
| 6,415,916 B1 | 7/2002 | Rini | |
| 6,477,514 B1 | 11/2002 | Gil et al. | |
| 6,479,016 B1 | 11/2002 | Goldsmith et al. | |
| 6,529,446 B1 | 3/2003 | de la Huerga | |
| 6,540,081 B1 | 4/2003 | Balz et al. | |
| 6,571,983 B1 | 6/2003 | Schumann | |
| 6,573,057 B1 | 6/2003 | Goodearl et al. | |
| 6,573,282 B1 | 6/2003 | Yaksh et al. | |
| 6,573,293 B1 | 6/2003 | Tang et al. | |
| 6,574,166 B1 | 6/2003 | Niemiec | |
| 6,576,325 B1 | 6/2003 | Yamanaka et al. | |
| 6,576,650 B1 | 6/2003 | Yaksh | |
| 6,579,715 B1 | 6/2003 | Friedrich et al. | |
| 6,579,854 B1 | 6/2003 | Mitchell et al. | |
| 6,579,897 B1 | 6/2003 | Tang et al. | |
| 6,581,799 B1 | 6/2003 | Garrant et al. | |
| 6,582,735 B1 | 6/2003 | Stogniew et al. | |
| 6,582,957 B1 | 6/2003 | Turner, Jr. et al. | |
| RE38,174 E | 7/2003 | Look | |
| 6,586,390 B1 | 7/2003 | Haley et al. | |

| | | | | | | |
|---|---|---|---|---|---|---|
| 6,589,559 B1 | 7/2003 | Yanagawa | | 2003/0189058 A1 | 10/2003 | Liff |
| 6,589,560 B1 | 7/2003 | Foster et al. | | 2003/0195644 A1 | 10/2003 | Borders |
| 6,593,080 B1 | 7/2003 | Smith | | 2003/0205412 A1 | 11/2003 | Hewitt |
| 6,593,104 B1 | 7/2003 | Stone et al. | | 2003/0209317 A1 | 11/2003 | Koehler |
| 6,596,723 B1 | 7/2003 | Watkins et al. | | 2003/0219513 A1 | 11/2003 | Gordon |
| 6,596,772 B1 | 7/2003 | Huang et al. | | 2005/0121528 A1 | 6/2005 | Lubow |
| 6,599,902 B1 | 7/2003 | Cui et al. | | 2005/0131733 A1 | 6/2005 | Lubow |
| 6,601,729 B1 | 8/2003 | Papp | | | | |
| 6,604,019 B1 | 8/2003 | Ahlin et al. | | FOREIGN PATENT DOCUMENTS | | |
| 6,605,437 B1 | 8/2003 | Kleyn et al. | | | | |
| 6,605,644 B1 | 8/2003 | Kamin et al. | | EP | 0214759 | 3/1897 |
| 6,610,497 B1 | 8/2003 | Acton et al. | | EP | 0036951 | 10/1981 |
| 6,610,536 B1 | 8/2003 | Tang et al. | | EP | 0037649 | 10/1981 |
| 6,610,688 B1 | 8/2003 | Liang et al. | | EP | 0066680 | 12/1982 |
| 6,611,733 B1 | 8/2003 | De La Huerga | | EP | 0072910 | 3/1983 |
| 6,612,497 B1 * | 9/2003 | Iida et al. ............... 235/462.25 | | EP | 0094800 | 11/1983 |
| 6,616,932 B1 | 9/2003 | Chrai et al. | | EP | 0105061 | 4/1984 |
| 6,617,459 B1 | 9/2003 | Peters et al. | | EP | 0115956 | 8/1984 |
| 6,620,473 B1 | 9/2003 | Nishizawa et al. | | EP | 0124803 | 11/1984 |
| 6,625,955 B1 | 9/2003 | Aylward | | EP | 0131964 | 1/1985 |
| 6,627,031 B1 | 9/2003 | Pinchen et al. | | EP | 0134996 | 3/1985 |
| 6,630,158 B1 | 10/2003 | Popp et al. | | EP | 0135117 | 3/1985 |
| 6,630,304 B1 | 10/2003 | Styrkarsdottir et al. | | EP | 0160860 | 11/1985 |
| 6,631,825 B1 | 10/2003 | Garrant et al. | | EP | 0162510 | 11/1985 |
| 6,635,640 B1 | 10/2003 | Tang et al. | | EP | 0170854 | 2/1986 |
| 6,635,742 B1 | 10/2003 | Boyle et al. | | EP | 0179940 | 5/1986 |
| 6,638,977 B1 | 10/2003 | Madison et al. | | EP | 0190009 | 8/1986 |
| 6,642,232 B1 | 11/2003 | Mattson et al. | | EP | 0193295 | 9/1986 |
| 6,642,251 B1 | 11/2003 | Tang et al. | | EP | 0197425 | 10/1986 |
| 6,645,758 B1 | 11/2003 | Schnipelsky et al. | | EP | 0205691 | 12/1986 |
| 6,649,657 B1 | 11/2003 | Cameron et al. | | EP | 0210728 | 2/1987 |
| 6,651,378 B1 | 11/2003 | Baker | | EP | 0223343 | 5/1987 |
| 6,652,929 B1 | 11/2003 | Moriya et al. | | EP | 0304146 | 2/1989 |
| 6,653,308 B1 | 11/2003 | Guan et al. | | EP | 0306727 | 3/1989 |
| 6,653,526 B1 | 11/2003 | Leviten | | EP | 0386097 | 5/1989 |
| 6,656,940 B1 | 12/2003 | Tang et al. | | EP | 0322134 | 6/1989 |
| 6,660,744 B1 | 12/2003 | Hirst et al. | | EP | 0335209 | 10/1989 |
| 6,663,746 B1 | 12/2003 | Dronzek | | EP | 0354817 | 2/1990 |
| 6,664,239 B1 | 12/2003 | Mitchell et al. | | EP | 0383322 | 8/1990 |
| 6,685,095 B1 * | 2/2004 | Roustaei et al. ........ 235/472.01 | | EP | 0444331 | 9/1991 |
| 2001/0002448 A1 | 5/2001 | Wilson | | EP | 0461298 | 12/1991 |
| 2001/0020594 A1 | 9/2001 | Hicks | | EP | 0471530 | 2/1992 |
| 2001/0028308 A1 | 10/2001 | De La Huerga | | EP | 0471854 | 2/1992 |
| 2001/0037465 A1 | 11/2001 | Hart | | EP | 0496455 | 7/1992 |
| 2002/0007281 A1 | 1/2002 | Gil | | EP | 0502396 | 9/1992 |
| 2002/0019777 A1 | 2/2002 | Schwab | | EP | 0536374 | 11/1992 |
| 2002/0026768 A1 | 3/2002 | Duncan | | EP | 0592620 | 9/1993 |
| 2002/0061981 A1 | 5/2002 | Donald | | EP | 0568088 | 11/1993 |
| 2002/0061982 A1 | 5/2002 | Donald | | EP | 0572999 | 12/1993 |
| 2002/0072079 A1 | 6/2002 | Woodaman | | EP | 0574129 | 12/1993 |
| 2002/0088855 A1 | 7/2002 | Hodes | | EP | 0729412 | 5/1995 |
| 2002/0091537 A1 | 7/2002 | Algazi | | EP | 0745536 | 5/1995 |
| 2002/0095238 A1 | 7/2002 | Ahlin | | EP | 0663654 | 7/1995 |
| 2002/0103653 A1 | 8/2002 | Huxter | | EP | 0749362 | 9/1995 |
| 2002/0107305 A1 | 8/2002 | Edler | | EP | 0686564 | 12/1995 |
| 2002/0116267 A1 | 8/2002 | Weisz | | EP | 0686900 | 12/1995 |
| 2002/0117405 A1 | 8/2002 | Wang | | EP | 0775324 | 2/1996 |
| 2002/0124945 A1 | 9/2002 | Muir | | EP | 0699304 | 3/1996 |
| 2002/0133434 A1 | 9/2002 | Nevel | | EP | 0788635 | 5/1996 |
| 2002/0147152 A1 | 10/2002 | Bell | | EP | 0715273 | 6/1996 |
| 2002/0147153 A1 | 10/2002 | Bell | | EP | 0747871 | 12/1996 |
| 2002/0150649 A1 | 10/2002 | Bell | | EP | 0852520 | 4/1997 |
| 2002/0158137 A1 | 10/2002 | Bell | | EP | 0855894 | 4/1997 |
| 2002/0196150 A1 | 12/2002 | Wildman | | EP | 0772151 | 5/1997 |
| 2003/0015592 A1 | 1/2003 | Brabaw | | EP | 0798239 | 10/1997 |
| 2003/0042167 A1 | 3/2003 | Balz | | EP | 0800156 | 10/1997 |
| 2003/0070394 A1 | 4/2003 | Rosenbaum | | EP | 0912319 | 12/1997 |
| 2003/0099158 A1 | 5/2003 | De La Huerga | | EP | 0929874 | 4/1998 |
| 2003/0113228 A1 | 6/2003 | Goldsmith | | EP | 0843293 | 5/1998 |
| 2003/0115162 A1 | 6/2003 | Konick | | EP | 0847865 | 6/1998 |
| 2003/0143287 A1 | 7/2003 | Bell | | EP | 0893257 | 1/1999 |
| 2003/0151247 A1 | 8/2003 | Nishizawa | | EP | 0915014 | 5/1999 |
| 2003/0173118 A1 | 9/2003 | Schuller | | EP | 0918416 | 5/1999 |

| | | |
|---|---|---|
| EP | 1037806 | 6/1999 |
| EP | 0949599 | 10/1999 |
| EP | 0986035 | 3/2000 |
| EP | 1006358 | 6/2000 |
| EP | 1041529 | 10/2000 |
| EP | 1055715 | 11/2000 |
| EP | 1061409 | 12/2000 |
| EP | 1076007 | 2/2001 |
| EP | 1117058 | 7/2001 |
| EP | 1125849 | 8/2001 |
| EP | 1176003 | 1/2002 |
| EP | 1197892 | 4/2002 |
| EP | 1205873 | 5/2002 |
| EP | 1234672 | 5/2002 |
| EP | 1211191 | 6/2002 |
| EP | 1226806 | 7/2002 |
| EP | 1234661 | 8/2002 |
| EP | 1302300 | 4/2003 |
| EP | 1359527 | 11/2003 |
| GB | 1502075 | 2/1978 |
| GB | 2163582 | 2/1986 |
| GB | 2223453 | 4/1990 |
| GB | 2229809 | 10/1990 |
| GB | 2283318 | 5/1995 |
| GB | 2292361 | 2/1996 |
| JP | 03-029729 | 2/1991 |
| JP | 04192092 A | 7/1992 |
| JP | 05-229505 | 9/1993 |
| JP | 07-038299 | 2/1995 |
| JP | 08-007058 | 1/1996 |
| JP | 10-139025 | 5/1998 |
| JP | 2001-109960 | 4/2001 |
| JP | 2002-068147 | 3/2002 |
| JP | 2002-352332 | 12/2002 |
| JP | 2003-016528 | 1/2003 |
| JP | 2003-168170 | 6/2003 |
| WO | WO 87/05882 | 10/1987 |
| WO | WO 94/27126 | 11/1994 |
| WO | WO 94/27144 | 11/1994 |
| WO | WO 95/31336 | 11/1995 |
| WO | WO 96/19776 | 6/1996 |
| WO | WO 97/03888 | 2/1997 |
| WO | WO 97/11790 | 4/1997 |
| WO | WO 97/48543 | 12/1997 |
| WO | WO 98/14777 | 4/1998 |
| WO | WO 98/20337 | 5/1998 |
| WO | WO 89/06191 | 11/1998 |
| WO | WO 00/24838 | 5/2000 |
| WO | WO 01/20478 | 3/2001 |
| WO | WO 02/21820 | 3/2001 |
| WO | WO 00/25720 | 5/2001 |
| WO | WO 01/35348 | 5/2001 |
| WO | WO 01/54984 | 8/2001 |
| WO | WO 01/58670 | 8/2001 |
| WO | WO 01/76128 | 10/2001 |
| WO | WO 02/35317 | 5/2002 |
| WO | WO 02/37305 | 5/2002 |
| WO | WO 03/017058 | 2/2003 |
| WO | WO 03/052681 A1 | 6/2003 |
| WO | WO 03/055770 | 7/2003 |
| WO | WO 2003/089313 A2 | 10/2003 |
| WO | WO 03/96873 | 11/2003 |
| WO | WO 2004/000520 A2 | 12/2003 |

OTHER PUBLICATIONS

International Preliminary Examination Report mailed Jun. 17, 2004 in International Application No. PCT/US03/20269.
International Preliminary Examination Report mailed Mar. 15, 2004 in corresponding International Application No. PCT/US02/41122.
International Search Report mailed Jan. 13, 2005 in corresponding International Application No. PCT/US03/12425.
International Search Report mailed Mar. 11, 2004 in corresponding International Application No. PCT/US03/20269.
Supplemental European Search Report mailed Sep. 5, 2005 in European Application No. 02805225.6.

* cited by examiner

FIG. 1

PRIOR ART

FIG. 2

PRIOR ART

DOUBLE-SIDED BAR CODE DOUBLING AS A SINGLE BAR CODE

CROSS-REFERENCE TO RELATED APPLICATION

This application is based upon and claims priority to U.S. provisional patent application Ser. No. 60/341,763 filed Dec. 17, 2001 and entitled MODIFIED BAR CODE SUBSTITUTING FOR DOUBLE-BAR CODED LABELS, the entire contents of which is hereby incorporated by reference.

FIELD OF THE INVENTION

The present invention relates to a system and method for creating a bar code, and more particularly, to printing a single bar code that can be used as two bar codes.

BACKGROUND OF THE INVENTION

A bar code symbology is a set of encoding algorithms, that essentially provides the grammar for the production of a bar code pattern. As in written languages, bar code symbologies have rules of grammar that dictate how the pattern of bars and spaces are formed for any particular coded data.

Figure 1:
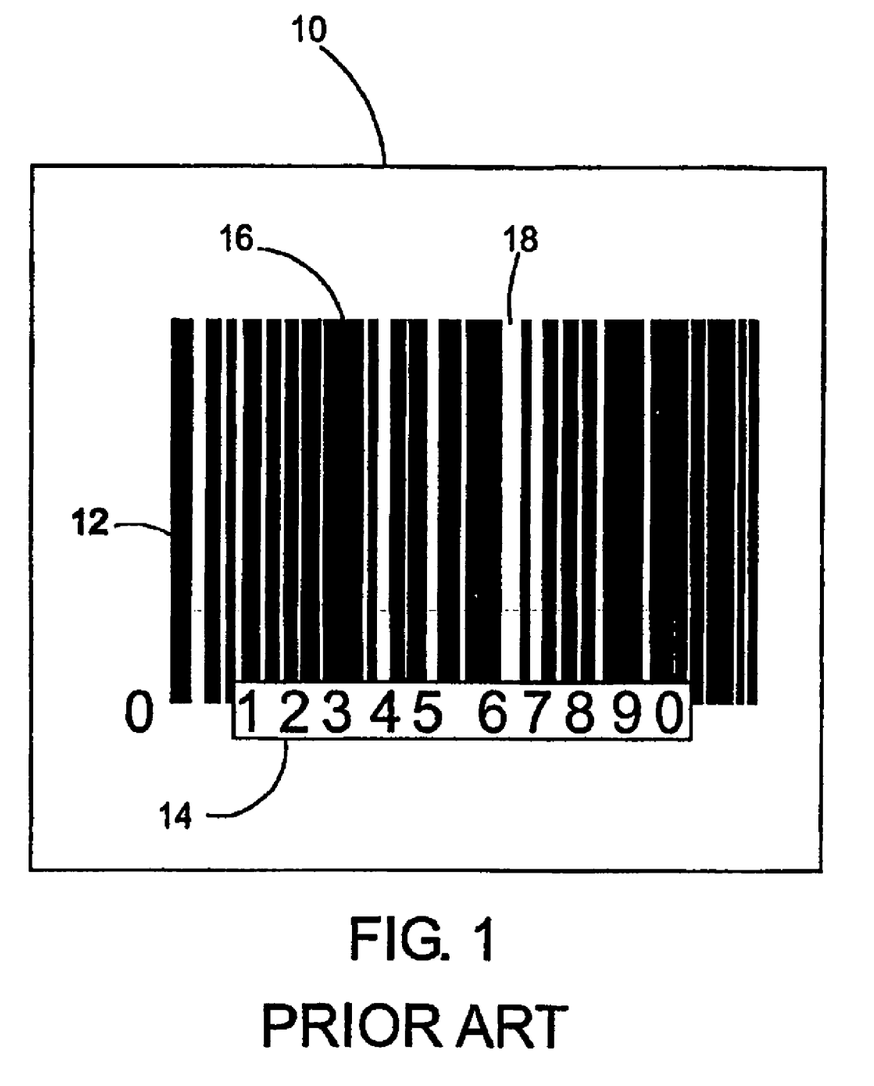
FIG. 1 shows a typical prior art UPC-A bar code image.

Among the most common bar code symbologies in the U.S. and Canada is the Universal Product Code (UPC-A). Referring now to the drawings wherein like numerals indicate like elements, there is shown in FIG. 1 a bar code symbol 10. The bar code symbol 10 comprises has a linear portion 12 and a human readable portion 14. The linear portion 12 comprises a pattern of bars 16 and spaces 18. The dimensions of the bars and spaces in the symbol are typically exact multiples of a unit bar. The unit bar is a narrow bar having a predetermined width for a bar code symbol at a given magnification.

Figure 2:
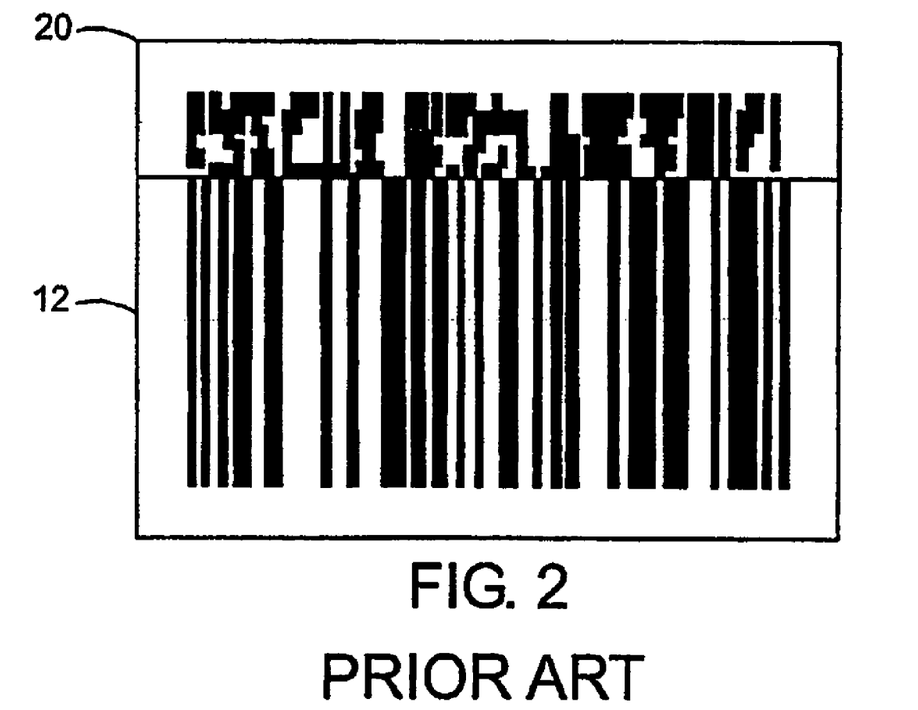
FIG. 2 shows a typical RSS-14 limited bar code image.

FIG. 2 shows an example prior art bar code image that has the RSS-14 Limited bar code symbology. Such a bar code comprises a two-dimensional component 20 that is coupled to ends of the linear portion 12 of the bar code. Much more information can be encoded into an RSS-14 limited bar code image than a UPC-A bar code image, and therefore, no human readable portion is shown in the bar code image in FIG. 2.

Prescription drugs, other medications, and some medical devices employ a method that uses two bar coded labels to expedite record keeping. Known in the art as "double bar-coded labels," two identical bar codes are printed on a single label. One of the bar codes appears in the main body of the label. The second bar code appears on a portion of the label intended to be removed by, typically by tearing through perforations. Whenever a product having a double bar coded label is administered to a patient, the removable portion of the label is torn from the product label and applied to the patient's record, for example, via a self-adhesive backing.

The prior art method of using double bar coded labels, however, carries the possibility of errors. For example, the two bar codes comprising the double bar coded label may be printed such that one bar code may not match the other. Moreover, one of the bar codes in the double bar coded label may be unreadable. In such case, the product may be scanned into hospital records but the label applied to the patient record is unreadable.

Additionally, printing two bar codes on a single label can be difficult and time-consuming. For example, a graphic designer who prepares artwork comprising double bar coded labels may mistakenly place two different bar code images in the artwork instead of two copies of the same bar code image. The information encoded in the bar code image is not human readable, and the information encoded in the bar code image may not be printed in human readable form. Moreover, the graphic designer must perform quality control to check his or her work for accuracy. To this end, and to prevent bar code production errors, bar coded labels must be verified with electronic verifiers to assure ability of each bar code to be printed and read. The verified results of each bar code are compared to each other to ensure the data match. The comparison is typically done manually, and therefore can also result in error.

SUMMARY OF THE INVENTION

In order to address the above-described problems in the prior art, the invention comprises positioning at the opposite ends of a standard linear bar code a two-dimensional bar code image, such as an RSS-14 limited bar code image. It is intended that the linear bar code, and particularly the surface, e.g., the label on which the bar code is printed, be separated, into an upper and a lower portion. Each portion contains part of the linear bar code and a respective portion including the same, entire two-dimensional bar code. The height of the linear bar code is increased, e.g., doubled, so that even when the bar code or the surface on which it is printed is separated e.g., along a separation line, defined by a perforation, or the like, enough of the linear bar code along with the respective portion of the two-dimensional bar code remain on the surface to be read.

The two-dimensional bar code image printed above and below the linear bar code may be printed in different ways. In one version, the image on the bottom is a mirror image, top to bottom, of the image on the top. In another version, the top and bottom images are inverted, e.g., one is a mirror image of the other and the mirror image is rotated 180° around a vertical axis. In the latter embodiment, whether the two-dimensional bar code image is above or below the linear bar code, when the two-dimensional image is received on the separated top or bottom portions of the complete bar code, the two-dimensional portion of the bar code appears identical to view and to a scanning device.

The bar code may be printed on a surface, e.g., a label applied to an object. An appropriate separator or separating line may be provided in the bar code label enabling its separation.

BRIEF DESCRIPTION OF THE DRAWINGS

For the purposes of illustrating the invention, there is shown in the drawings a form which is presently preferred, it being understood, however, that the invention is not limited to the precise arrangements and instrumentalities shown. Further, it is intended herein that the bar code images provided in the corresponding reference figures are merely illustrative, and that the bar code images shown in the figures will not yield useful information to a bar code reading device, such as a scanner.

The features and advantages of the present invention will become apparent from the following description of the invention that refers to the accompanying drawings, in which.

DETAILED DESCRIPTION OF EMBODIMENTS OF THE INVENTION

The present invention is directed to a modified single bar code graphic image that is substituted for two duplicate bar codes comprising prior art double bar coded labels. In accordance with the present invention, in an application of use of the invention, the linear portion of a prior art single bar code image is increased, for example, by at least twice the height of a conventional linear bar code used in the particular application. From the increased height of a linear bar code used in the particular application, substantially half of the height of the bar code graphic image is separated from the other half of the height of the image, e.g., by separating the bar code across the linear bar code section. Each section of the bar code is removed and placed separately, for example, on a patient's chart. The height of the now separate linear portions is still tall enough to ensure that each of the portions of the originally single bar code image can be read by a bar code reading device, such as a scanner, wand, optical scanner or verifier. The added height further ensures that a part of the height of the bar code image may be destroyed while each of the portions remains capable of being read by a bar code reading device. Both portions of the bar code image are large enough and particularly tall enough to support a blank area surrounding the image, for example, for graphic clarity and to support a quiet-zone that is required for reading.

Figure 3:
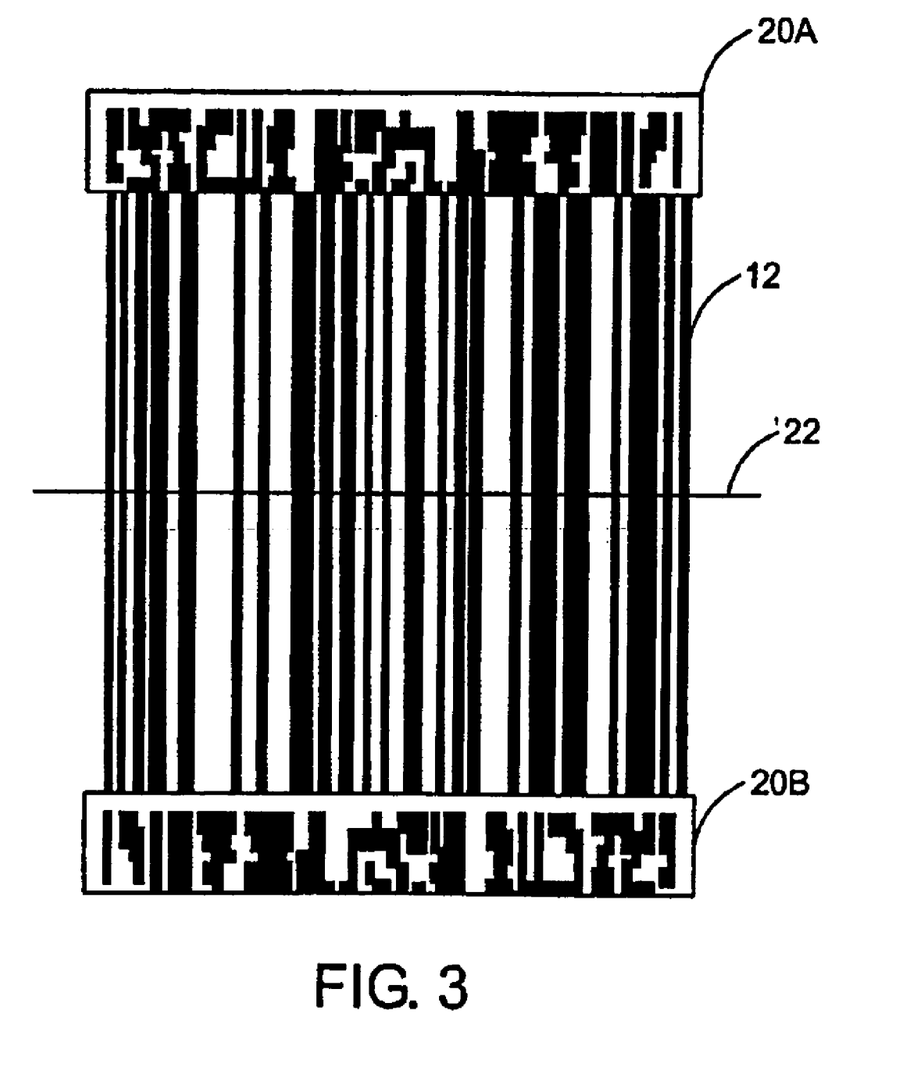
FIG. 3 shows a modified bar code image substituting for double bar coded labels in one embodiment of the present invention.

FIG. 3 shows one preferred embodiment of the present invention. In the examples shown in FIG. 3, a RSS-14 limited bar code image comprising two-dimensional portions (20A and 20B) is shown. The top two-dimensional component (20A) is positioned as in a typical prior art RSS-14 limited bar coded image. The bottom two-dimensional portion (20B) is positioned below the linear portion 12 of the bar code image. In the examples shown in FIG. 3, the bottom two-dimensional portion 20B is printed as an inverted mirror image of the top two-dimensional portion 20A. As shown, this means that if the paper on which FIG. 3 appears is inverted, the RSS-14 image will be the same, that is, the image then at the top is identical and would be read the same as the other end image, were the latter then at the top. To accomplish this, the linear portion 12 of the RSS-14 limited bar code image is extended, and the top two-dimensional portion 20A is inverted and rotated 180° around a vertical (end to end) axis before being placed at the bottom of the linear portion 12 as two-dimensional portion 20B.

In FIG. 3, a perforation 22 is preferably used for enabling tearing and removal of a portion of the bar code image in accordance with the present invention. Perforation 22 may be a series of small holes, a single line marking, a slit, a cut, another weakened line or other demarcation that enables removing a portion of the bar code image.

After one portion of the bar code image is removed, each of the removed portion and the remaining portion of the bar code still comprise a complete RSS-14 limited bar code image that is capable of being read by a bar code reading device. Since the two-dimensional portion 20A and the two-dimensional portion 20B are identical but inverted images of each other, the relationship between the linear portion 12 and the two-dimensional portions 20A and 20B is ensured. Moreover, by visually inspecting the modified RSS-14 bar code image shown in FIG. 3, a user can determine that the two-dimensional portions 20A and 20B are identical without the need for additional viewing devices, such as electronic verifiers.

Figure 4:
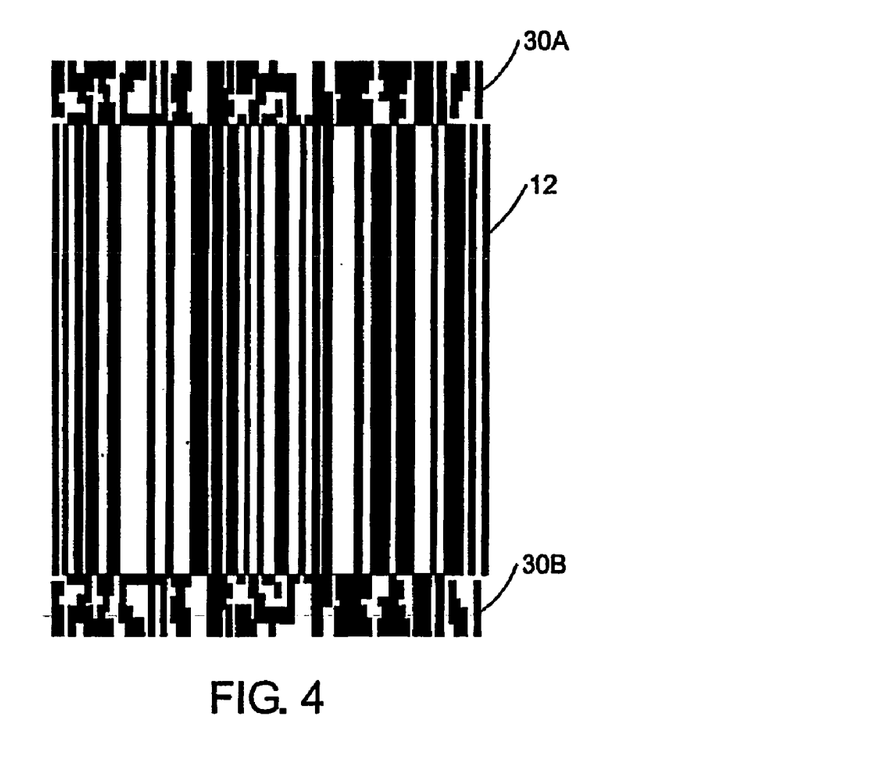
FIG. 4 shows a modified bar code image substituting for double bar coded labels in accordance with a second embodiment of the present invention.

FIG. 4 shows an alternative embodiment of the present invention, wherein the bottom two-dimensional portion 30B is not inverted as in FIG. 3, but is instead a top to bottom mirror image of the top two-dimensional portion 30A. In FIG. 4, the bottom two-dimensional portion 30B is not rotated before being placed at the bottom of the linear portion 12 of the bar code image.

Figure 5:
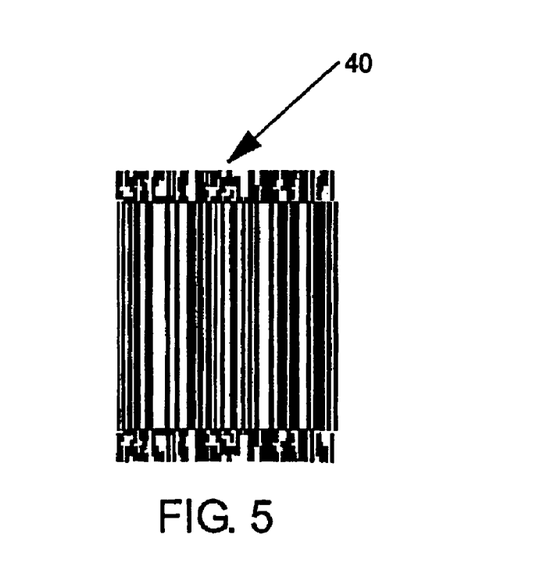
FIG. 5 shows a small example of a modified bar code image substituting for double bar coded labels in accordance with a third embodiment of the present invention.

FIG. 5 shows an example RSS-14 limited bar code image 40 having two-dimensional components as it may be sized, e.g., actual size of 1 cm×0.8 cm.

Figure 6:
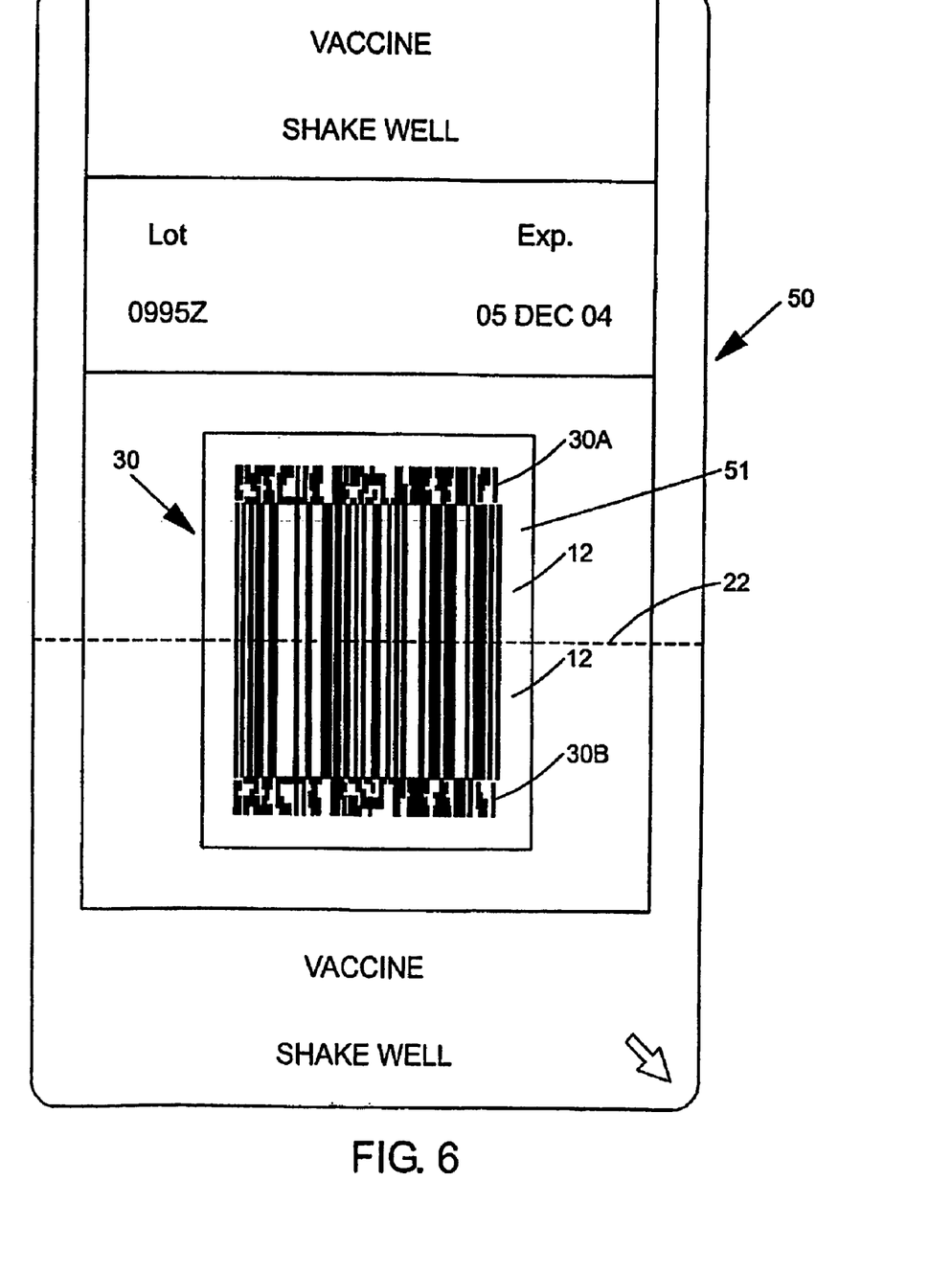
FIG. 6 shows a prescription medication label utilizing a modified bar code image substituting for a double bar coded label in accordance with the present invention.

Referring to FIG. 6, to reduce the possibility that the linear 12 and two-dimensional bar codes 30A and 30B on a product label 50 might not match, an imaging technique is devised whereby a single bar code 30, twice the normal height of a linear bar code typically used in that application on a label is printed across the perforations 22 of a peel-off label 50. This insures that the bar codes 12, 30A and 12, 30B of each label portion match at each side of the perforations 22. This technique allows a user to visually inspect that the single bar code 30 printed across both sides of the perforations are identical without the need for additional viewing devices.

To reduce the area required to print two matching bar codes 12, 30A and 12, 30B with surrounding clear space 51, a single bar code image 30 is created. The two intervening white spaces that would normally extend past the abutting sides of the two label sections surrounding the labels are eliminated, thereby reducing the overall space requirement for the bar code 30. This is particularly significant with regard to prescription drug labels, small ampoules and vials which have extremely limited space for printing bar code images, e.g. 10 mm×15 mm.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A bar code comprising:
  a first bar code portion providing first information, the first bar code portion having opposite ends;
  a first section of a second bar code portion providing second information and disposed at the first end of the first bar code portion; a second section of the second bar code portion disposed at the second end of the first bar code portion and also providing the second information, wherein the first and second sections of the second bar code portion provide identical second information;
  wherein the bar code is imprinted on a surface and the surface includes a separation region across the first bar code portion, such that the surface on which the bar code is imprinted may be separated at the separation region to separate the bar code into first and second parts, each part including some of the first section of the first bar code portion and a respective one of the sections of the second bar code portion.

2. The bar code of claim 1, wherein the bar code has a designated application and the first information on the bar code first portion is of a length between the opposite ends of the first bar code portion that is greater than the length of the first bar code information that is required for reading the first bar code information in the designated application, the length of the first information between the ends of the first bar code portion being selected so that upon separation of the surface on which the bar code is imprinted into the first and second parts, the length of the first bar code information on each of the first and second parts measured from a respective one of the first and second ends to the separation region is sufficient that in the designated application, the first information of the bar code can be read and the second information on each of the first and second parts of the surface can be read.

3. The bar code of claim 1, wherein the first information is linear bar code information extending between the first and second ends of the first portion of the bar code.

4. The bar code of claim 3, wherein the second bar code information is two-dimensional bar code information and differs from the linear bar code information in the first bar code portion.

5. The bar code of claim 1, wherein the second bar code information is two-dimensional bar code information and differs from the linear bar code information in the first bar code portion.

6. The bar code of claim 1, wherein the second information at the first end of the first bar code portion is upright in one orientation and the second information at the second end of the first bar code portion is inverted from the orientation of the second information at the first end of the first bar code portion.

7. The bar code of claim 6, wherein the information at the second end of the first bar code portion is additionally rotated 180° from the second information at the other end of the first bar code portion.

8. A bar code comprising:

a first bar code portion providing first information, the first bar code portion having opposite ends;

a first section of a second bar code portion providing second information and disposed at the first end of the first bar code portion; a second section of the second bar code portion disposed at the second end of the first bar code portion and also providing the second information, wherein the first and second sections of the second bar code portion provide identical second information;

wherein the second information at the first end of the first bar code portion is upright in one orientation and the second information at the second end of the first bar code portion is inverted from the orientation of the second information at the first end of the first bar code portion.

9. A bar code comprising:

a first bar code portion providing first information, the first bar code portion having opposite ends;

a first section of a second bar code portion providing second information and disposed at the first end of the first bar code portion; a second section of the second bar code portion disposed at the second end of the first bar code portion and also providing the second information, wherein the first and second sections of the second bar code portion provide identical second information;

wherein the information at the one end of the first bar code first portion is additionally rotated 180° from the second information at the other end of the first bar code portion.

* * * * *